United States Patent
Moore et al.

[11] Patent Number: 5,917,174
[45] Date of Patent: Jun. 29, 1999

[54] DEVICE FOR ASSISTING THE VISUALLY IMPAIRED IN PRODUCT RECOGNITION AND RELATED METHODS

[76] Inventors: Michael C. Moore, Box 41, Hibbs, Pa. 15433; Joshua D. Brown, R.D. #3, Box 50-A, Smithfield, Pa. 15478; Kevin M. Milliken, R.D. #3, Box 538-E, McClellandtown, Pa. 15458; Brian R. Cerullo, R.D. #1, Box 156-C, Adah, Pa. 15410; Gary W. Smith, R.D. #3, Box 538-E, McClellandtown, Pa. 15458; Martin W. Betchy, R.D. #1, Box 188 A-1, Smithfield, Pa. 15478

[21] Appl. No.: 08/808,824
[22] Filed: Feb. 28, 1997
[51] Int. Cl.⁶ .................................. G06K 7/10
[52] U.S. Cl. .................. 235/462.44; 235/462.45
[58] Field of Search ................ 235/462.44, 462.45

[56] References Cited

U.S. PATENT DOCUMENTS 5,177,800  1/1993  Coats .
5,319,185  6/1994  Obata .
5,340,972  8/1994  Sandor .
5,410,140  4/1995  Bard et al. .

*Primary Examiner*—Harold I. Pitts
*Attorney, Agent, or Firm*—Robert Blackmon

[57] ABSTRACT

A device and related method are provided for assisting visually impaired persons obtain verbal information from consumer product bar codes. The devices includes a scanner unit, a processing unit, a power unit and a voice synthesizer. The method involves the person scanning the bar code of the product with the scanner unit to provide a first signal which is communicated to the processing unit for locating, retrieving and outputting product information corresponding to the bar code in a form for the voice synthesizer to generate a verbal output to convey the information to the person. The bar code may be raised to assist the visually impaired person in locating the exact location of the bar code to facilitate scanning thereof. The device and the method provide the visually impaired person with a level of information that about the product that is not normally obtained without the assistance of another person.

10 Claims, 6 Drawing Sheets

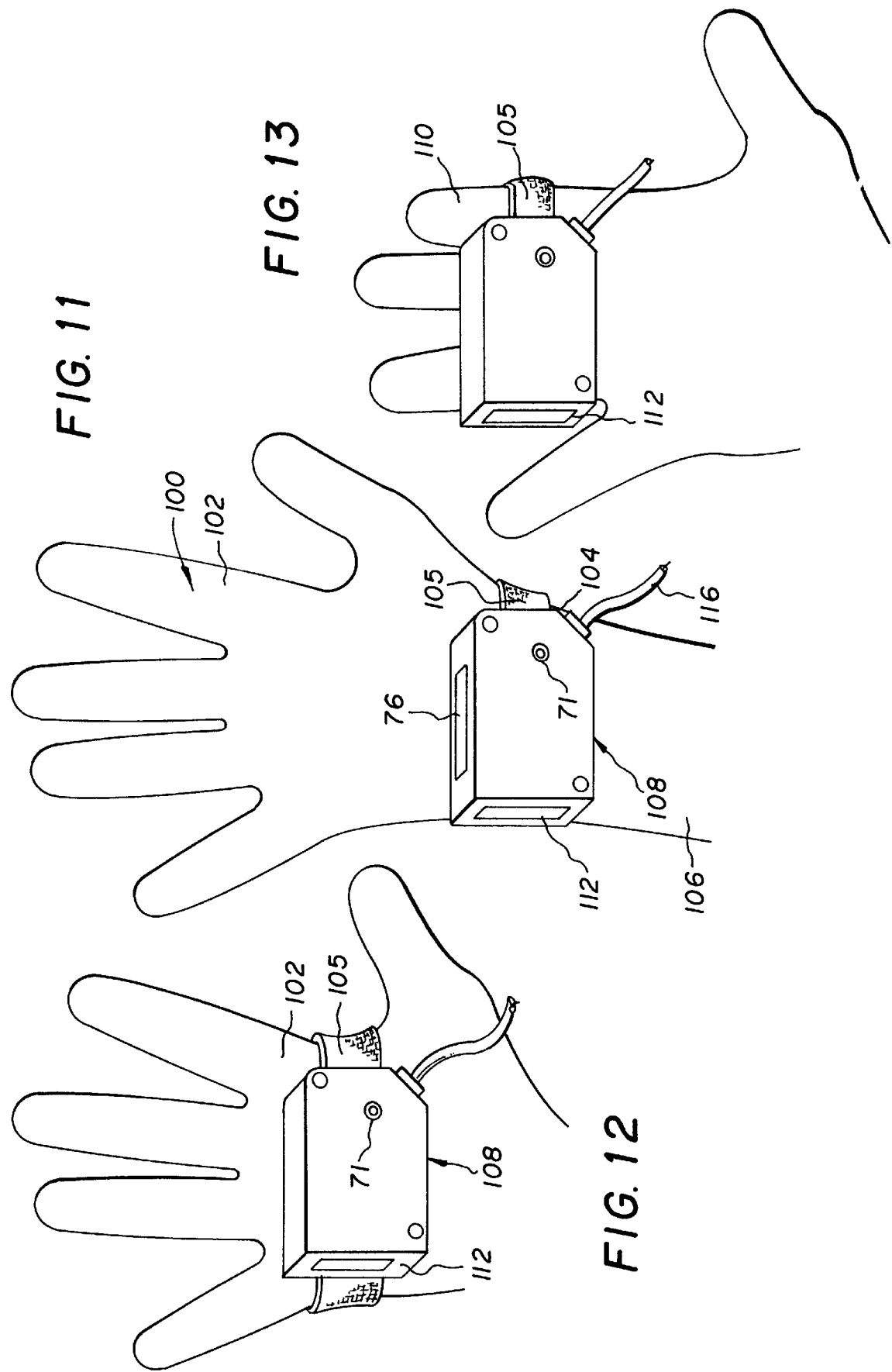

DEVICE FOR ASSISTING THE VISUALLY IMPAIRED IN PRODUCT RECOGNITION AND RELATED METHODS

BACKGROUND OF THE INVENTION

1. Field of the Invention

The present invention relates to devices and methods for assisting visually impaired persons recognize products, and more particularly relates to devices and methods for assisting visually impaired persons obtain specific product information during shopping.

2. Description of the Related Art

Various bar code scanning systems exist and the basic technology of bar code scanning is generally well known. Small hand held scanners have been developed, see for example Obata U.S. Pat. No. 5,319,185 issued Jun. 7, 1994, Sandor U.S. Pat. No. 5,340,972 issued Aug. 23, 1994, and Bard et al. U.S. Pat. No. 5,410,140 issued Apr. 25, 1995 all of which are incorporated herein by reference. None of the prior devices appear to be suitable for use by the visually impaired in product recognition or in assisting the visually impaired in obtaining product information during shopping.

Combining bar code recognition with speech synthesis has been taught for use as a teaching device wherein changeable memory modules including synthesized speech data developed to accompany corresponding printed lesson plans have been disclosed, see Coats U.S. Pat. No. 5,177,800 issued Jan. 5, 1993 which is incorporated herein by reference. The Coats' system however appears to not be adapted for use by the visually impaired for product recognition or for obtaining product information during shopping.

One problem that visually impaired shoppers often encounter when shopping in a market designed for people having full visual capabilities is that detailed product information such as brand, size, price and ingredients are not readily available without the assistance of another person to actually read the information for the container (label) of the product. This problem exists over a wide range of visual abilities ranging from blurred vision to complete blindness.

Consequently, there is a need for a device and related method for assisting visually impaired persons in obtaining product information during shopping or during other activities.

SUMMARY OF THE INVENTION

The present invention involves a device for assisting visually impaired persons in obtaining product information during shopping. The device has (i) a speech synthesizer, (ii) a power unit, (iii) a processing unit (computer means), and (iv) a scanner unit. Preferably the device includes a belt pack for carrying the speech synthesizer, power unit and processing unit, and preferably includes a ring or wrist strap for carrying the scanner.

The device allows the visually impaired to scan product bar codes and receive verbal information corresponding to the bar code. A method is also provided for assisting the visually impaired in obtaining product information for bar coded product, wherein the method involves (a) providing a speech synthesizer, a power unit, a computer processing unit and a scanner unit, (b) providing electronically stored product information relating specific product information to corresponding product bar codes, (c) scanning a product bar code with the scanner to provide an electronic signal (first signal) corresponding to the bar code, (d) processing the first signal to identify the information corresponding to the bar code and providing a second signal for the speech synthesizer to output verbal information corresponding to the bar code, and (e) communicating the second signal to the speech synthesizer to generate a verbal output corresponding the to the product information of the scanned bar code. The method may further involve providing product with a raised bar code to assist the visually impaired individual with determining the exact location of the product bar code to facilitate scanning thereof. A system (assembly) is also provided comprising the device and a consumer product having a bar code.

BRIEF DESCRIPTION OF THE INVENTION

Figure 9:
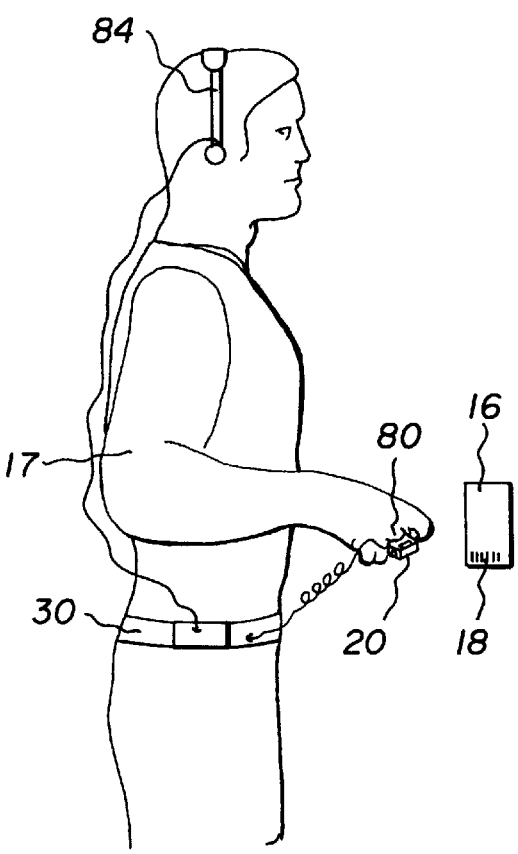
Figure 10:
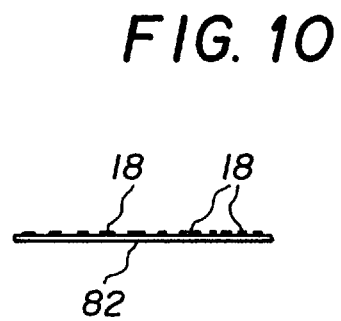
Figure 14:
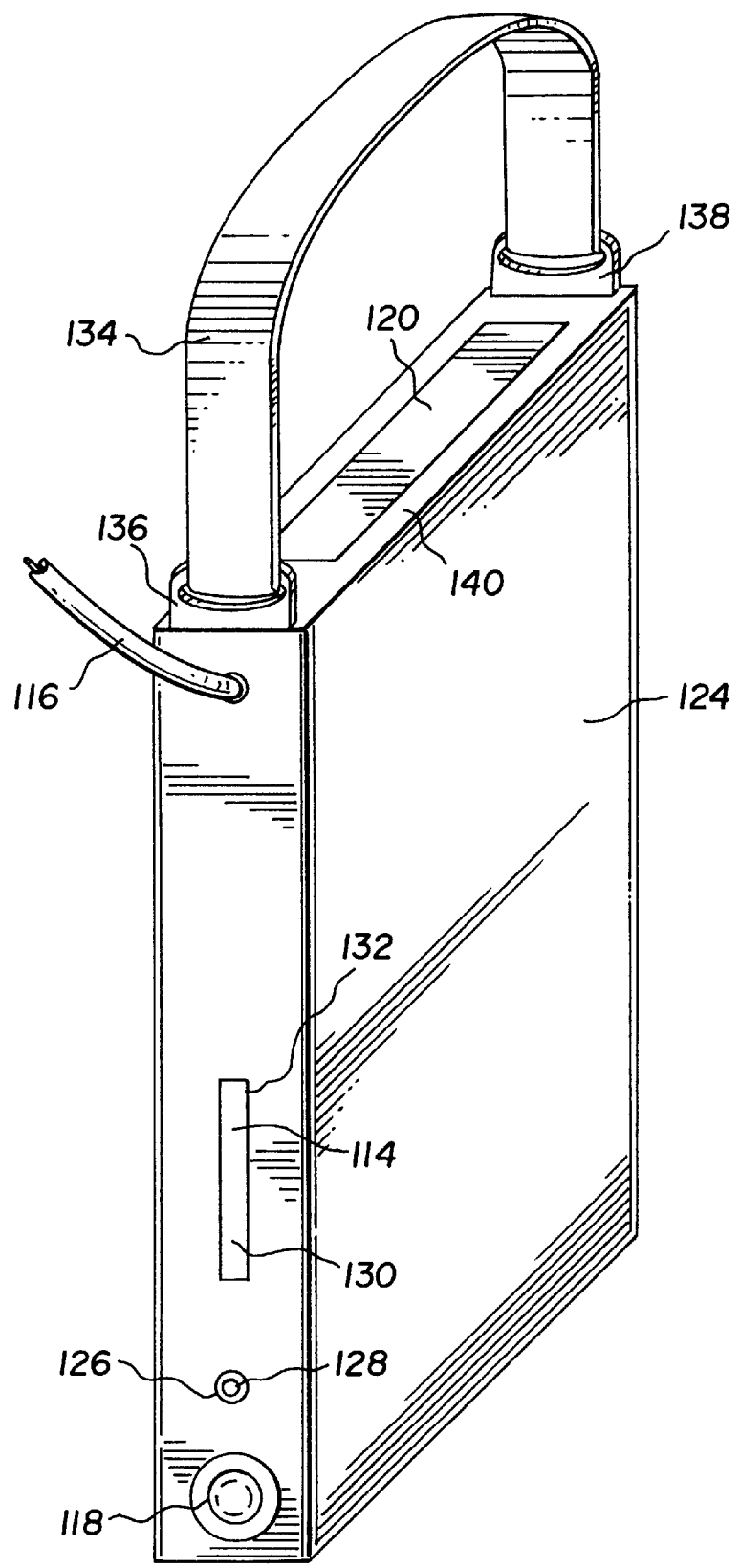

FIG. 9 is a perspective view of the device in being used by a person to scan a bar code of a product, FIG. 10 is a side elevational view of the raised bar code on the surface of a container of the product of FIG. 9, FIG. 11 is a front elevational view of an alternative embodiment of the device of the present invention worn on a wrist, FIG. 12 is a front elevational view of the device of FIG. 11 worn on a hand, FIG. 13 is a front elevational view of the device of FIG. 11 worn on a finger, and FIG. 14 is an alternative embodiment of the present invention having a shoulder strap.

DETAILED DESCRIPTION OF THE INVENTION

Figure 1:
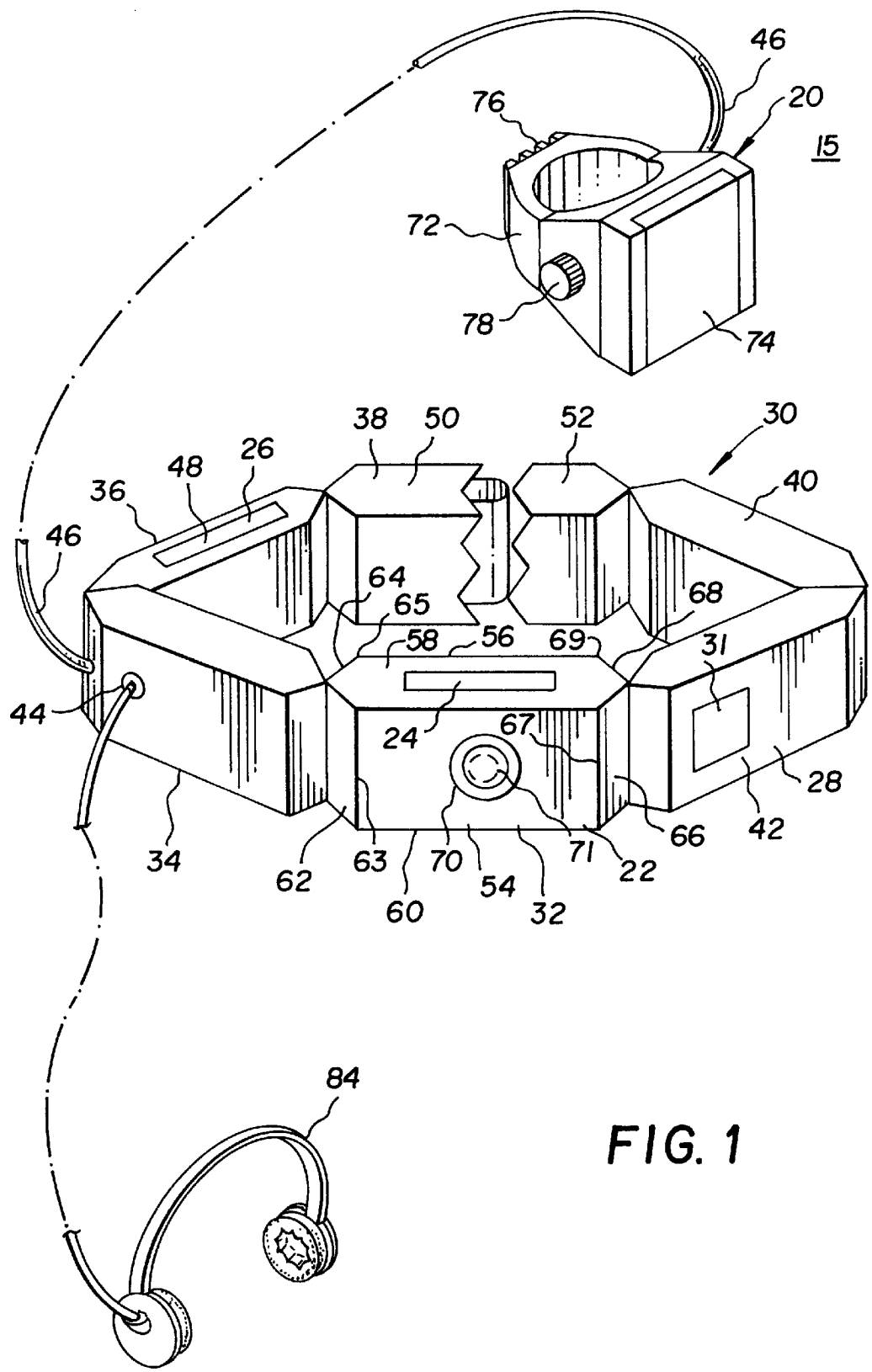
FIG. 1 is a perspective view of the device according to the present invention.
Figure 2:
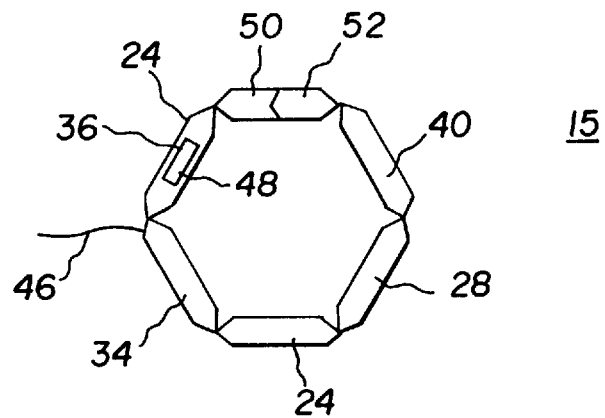
FIG. 2 is a top plan view of the belt of the device of FIG. 1.
Figure 3:
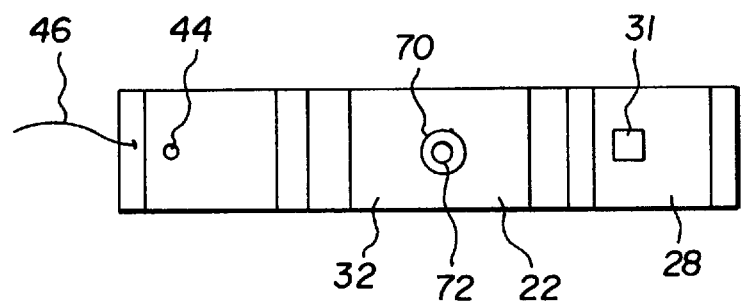
FIG. 3 is a front elevational view of the belt of FIG. 2.
Figure 4:
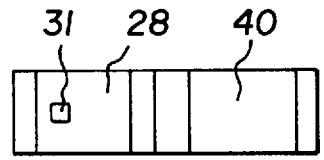
FIG. 4 is a right side elevational view of the belt of FIG. 2.
Figure 6:
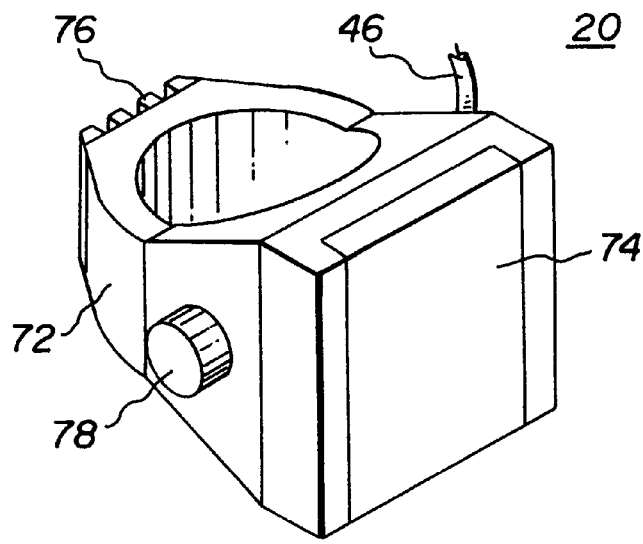
FIG. 6 is a front perspective view of the ring of the device of FIG. 1.
Figure 7:
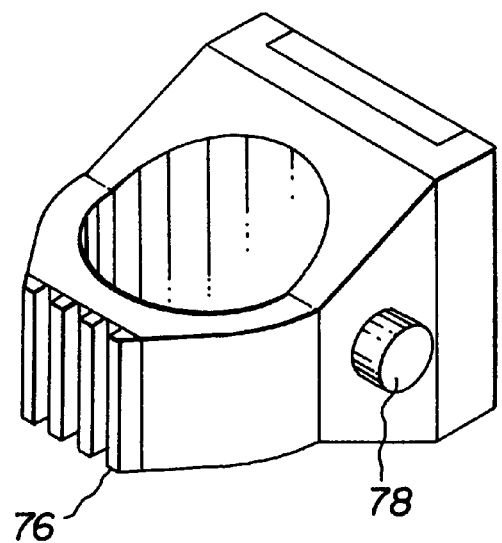
FIG. 7 is a rear perspective view of the ring of FIG. 6.
Figure 5:
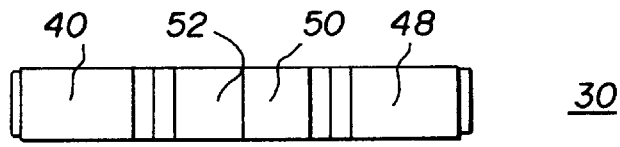
FIG. 5 is a rear elevational view of the belt of FIG. 2.
Figure 8:
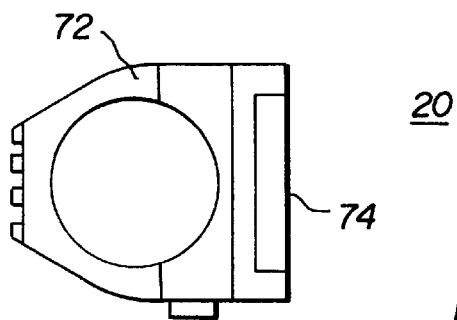
FIG. 8 is a top elevational view of the ring of FIG. 6.

As best shown in FIGS. 1 and 9, a device (15) is provided for assisting a visually impaired person (17) obtain information about a product (16) by scanning a product bar code (18) during shopping or during other activities where product information is important. The device (15) has a scanner unit (20) in communication with a processing unit (22) for feeding scanned information from the bar code (18) of the product (16) to the processing unit (computer means) (22) for accessing, locating and retrieving corresponding product information from an electronic information storage element (24), such as a computer disk or cd rom or a hard drive, and outputting a second signal. The device (15) further includes a power unit (26) for providing power to the processing unit (22) and preferably also to the scanner unit (20). The device (15) also has a voice synthesizer (28) for converting the second signal received from the processing unit into audible voice form by a speaker (31) for conveying the information to the person (17). The processing unit (22), storage element (24), power unit (26) and voice synthesizer (28) may be carried on a belt (30). The belt (30) may have separate compartments (32, 34, 36, 38, 40, 42) which each may house a particular element or unit. For example, processing unit (22) may be housed in first compartment (32), second compartment (34) may have a head phone jack (44) (or alternatively the head phone jack may be located in sixth compartment (42)) and may have a communication wire (46) for communication between the scanner unit (20) and processing unit (22), third compartment (36) may contain the power unit (26) which is preferably in the form of a rechargeable batter pack (26) having a rechargeable battery (48) for providing a direct current power supply, fourth compartment (38) may be the buckle compartment having two interconnectable halves (50, 52) for buckling and unbuckling of the belt (30), fifth compartment may provide storage space for miscellaneous items such as cash or identification or credit cards, and the sixth compartment (42) may house the voice synthesizer (28). The compartments may be sequentially hinged (interconnected) to form a loop when the buckle halves (50, 52) are latched close. In other words the first compartment (32) is flexibly connected to the second compartment (34) which is flexibly connected to the third compartment (36) which is flexibly connected to the forth compartment (38) which is flexibly connected to the fifth compartment (40) which is flexibly connected to the sixth compartment (42) which is flexibly connected to the first compartment (32). Preferably, the compartments (32, 34, 36, 38, 40, 42) are the shape of an elongated hexagon in horizontal cross-section having a rectangular outer side (54), a rectangular inner side (56) spaced apart from the outer side (54), a rectangular top side (58), a rectangular bottom side (60) spaced apart from the top side (58), wherein the top and bottoms sides (58, 60) extend between the inner and outer sides (54, 56). Each compartment has a first slant side (62) extending inwardly from one end (63) of the outer side (54) at an obtuse angle therefrom and is interconnected with a second slant side (64) which extends from one end (65) of the inner side (56) at an obtuse angle therefrom; and each compartment has a third slant side (66) which extends inwardly from a second end (67) of the outer side (54) at an obtuse angle therefrom and is interconnected with a fourth slant side (68) which extends from a second end (69) of the inner side (56). The first compartment (32) preferably has a circular opening (70) for permitting an on/off button (71) of the disk drive (22) to extend therethrough for manual actuation of the device (15).

The scanner unit (20) is preferably in the form of a ring (72) (the size of which will depend on the level of miniturization available, commercially feasible versions may be larger or small than configuration illustrated in the drawings) having (carrying) a bar code scanner (74) and optionally a tone generator (76) to indicate that scanning has either been successful or unsuccessful. The unit (20) preferably also includes an activation button (78) for activating the tone generator (76) and scanner (74). Optionally, the scanner unit (20) may optionally be of the design set out in Obata U.S. Pat. No. 5,319,185 issued Jun. 7, 1994 and Bard et al. U.S. Pat. No. 5,410,140 issued Apr. 25, 1995 both of which are incorporated herein by reference. The scanner unit (20) may be mounted on (received by) a finger (80), such as an index finger or third finger, of the person (17). The ring (72) has an annular structure for receiving the finger (80). The processing unit (22) includes an internal decoder (not shown) as is well known in the bar code scanning art. The device (15) may include typical components of a scanning system, as disclosed in Bard et al., such as the analog signal processing circuitry, digitizer, decoder and any necessary interface to the processing unit (data processing system).

The bar code (18) is preferably slightly raised print for easy locating by touch by the visually impaired individual (17). The bar code print may be raised from for example 0.01 to 2 mil, for further example from 0.02 mil to 1 mil above the surface of the underlying paper substrate (82). Raised print is a well known technology for items such as business cards.

The processing unit and voice (speech) synthesizer are in communication for the processing unit to provide the voice synthesizer with input for generating the desired voice output containing the product information, such as brand name, size, product type and price. Coats U.S. Pat. No. 5,177,880 discloses a bar code activated speech synthesizer and is incorporated herein by reference. A head phone (84) may be used for private listening of the verbal output, by plugging the head phone (84) into the jack (44) and placing the head phone on the head of the person (17).

As best shown in FIGS. 11–13, an alternative embodiment of the present invention provides a device (108) which may be worn on the a wrist (104) of a wearer (100) as shown in FIG. 11, or on the middle of the hand (102) (across the palm of the hand) as best shown in FIG. 12, or on a finger (110) as best shown in FIG. 13. The device has an elastic band (105) which may be used to hold the scanning unit in place around the hand, wrist or finger of the wearer.

The device (108) has a scanner unit (112) for providing a first signal in response to bar code information scanned by the scanner unit (112), a computer processing unit (114) connected to the scanner unit (112) by a connecting wire (116) for receiving the first signal, locating consumer product information corresponding to the bar code and generating a second signal, and a voice synthesizer (118) connected to the computer processing unit (114) to receive the second signal. The voice synthesizer (118) provides a verbal output containing spoken language information corresponding to the bar code information. The device preferably has a rechargeable battery pack (120) for providing power to the device. An outer housing unit (124) which may be made of a suitable durable plastic such as that used for laptop computers, for example polycarbonate/acrylonitrile-butadiene-styrene polymeric compositions (CYCOLOY brand PC/ABS resin from General Electric Company). The housing unit (124) is preferably box shaped having a hollow interior for containing the battery pack (120), the voice synthesizer (118) and the computer processing unit (114). The voice synthesizer (118) has a headphone jack (126) accessible through a hole (128). The computer processing unit (114) has a drive (130) which is accessible through a slot (132) in the housing (124). A shoulder strap (134) is attached to spaced apart tabs (136,138) on the top (140) of the housing (124). The top (140) has a port (142) for permitting removal and insertion of the rechargeable batteries (120). The shoulder pack arrangement of FIG. 14 permits carrying of the weight in a comfortable and easily removable fashion. The straps (134) may be made of a woven material, leather or any other suitable strap material.

What is claimed is:

1. A device for providing visually impaired persons with verbal output of bar coded consumer product information on a consumer product, said device comprising:

(a) a scanner unit for providing a first signal in response to bar code information on a consumer product scanned by said scanner unit, (b) a computer processing unit connected to said scanner unit for receiving said first signal, locating consumer product information corresponding to said bar code, and generating a second signal, (c) a voice synthesizer connected to said computer processing unit to receive said second signal, said voice synthesizer being for general a verbal output of said consumer product information containing spoken language information corresponding to said bar code.

2. The device of claim 1 wherein said scanner unit is carried by a ring structure suitable for being worn on a persons finger.

3. The device of claim 1 wherein said computer processing unit and said voice synthesizer are carried on a belt suitable for being worn by a person.

4. The device of claim 2 wherein said ring has a tone generator attached thereto for generating a first tone upon a successful scanning of the bar code and for generating a second tone upon unsuccessful scanning of the bar code.

5. A system for assisting a visually impaired person in obtaining aural product information about a consumer product, said system comprising:

(a) a consumer product having a container, said container having a bar code thereon, (b) a scanner unit for scanning said bar code and providing a first signal in response to bar code information scanned by said scanner unit, (c) computer processing unit connected to said scanner unit for receiving said first signal, locating consumer product information corresponding to said scanned bar code, and generating a second signal, and (d) a voice synthesizer connected to said computer processing unit to receive said second signal, said voice synthesizer being for general an audible output containing spoken language product information corresponding to said bar code.

6. The system of claim 5 wherein said bar code is in the form of raised print on a surface of said container, said print having an elevation of between 0.05 mil and 2 mil above said surface.

7. The system of claim 5 wherein said scanning unit is carried on a ring structure and said voice synthesizer and said computer processing unit are carried on a belt.

8. A method for assisting the visually impaired obtain consumer product information from a bar code on a consumer product, said method comprising:

(a) providing a device comprising (i) a scanner unit for providing a first signal in response to bar code information scanned by said scanner unit, (ii) a computer processing unit connected to said scanner unit for receiving said first signal, locating consumer product information corresponding to said bar code, and generating a second signal, and (iii) a voice synthesizer connected to said computer processing unit to receive said second signal, said voice synthesizer being for generating a verbal output containing spoken language information corresponding to said bar code, (b) scanning a bar code from a consumer product with said scanning unit, (c) listening to verbal output of said product information from said voice synthesizer.

9. The method of claim 8, further comprising providing an electronic storage element containing product information or other relevant data corresponding to said bar code.

10. The method of claim 8, wherein said device comprise a ring for carrying said scanner unit, and comprises a belt for carrying said computer processing unit and said voice synthesizer.

* * * * *